United States Patent
Yu et al.

(10) Patent No.: US 8,558,881 B2
(45) Date of Patent: Oct. 15, 2013

(54) TELESCOPIC PROBE MONITORING SYSTEM FOR RIVERBEDELEVATION MONITORING AT BRIDGE PIERS

(75) Inventors: Teng-Yi Yu, Hsinchu (TW); Wen-Yi Chang, Hsinchu (TW); Franco Lin, Hsinchu (TW); Lung-Chang Lee, Hsinchu (TW); Whey-Fone Tsai, Hsinchu (TW); Jihn-Sung Lai, Taipei (TW); Chin-Hsiung Loh, Taipei (TW)

(73) Assignee: National Applied Research Labortories, Hsinchu (TW)

( * ) Notice: Subject to any disclaimer, the term of this patent is extended or adjusted under 35 U.S.C. 154(b) by 310 days.

(21) Appl. No.: 13/158,687

(22) Filed: Jun. 13, 2011

(65) Prior Publication Data
US 2012/0127300 A1   May 24, 2012

(30) Foreign Application Priority Data
Nov. 23, 2010   (TW) ................ 99140288 A

(51) Int. Cl.
*H04N 7/18* (2006.01)
*H04N 5/228* (2006.01)

(52) U.S. Cl.
USPC ............................ 348/81; 348/222.1; 348/61

(58) Field of Classification Search
USPC ...................................... 348/81–85
See application file for complete search history.

(56) References Cited

U.S. PATENT DOCUMENTS

2002/0113870 A1*   8/2002   Mueckl et al. .................. 348/84

* cited by examiner

*Primary Examiner* — David Czekaj
*Assistant Examiner* — Nam Pham
(74) *Attorney, Agent, or Firm* — Rosenberg, Klein & Lee

(57) ABSTRACT

A telescopic probe monitoring system for riverbed elevation monitoring at a bridge pier is revealed. The system includes a measurement module for measuring riverbed elevation under water and a control module. The measurement module includes a housing, a multi-layer tube, a driving member with scales, a photographic unit for capturing images, and a sensing unit. The control module controls the driving member to extend the multi-layer tube. Thus the sensing unit on the bottom of the multi-layer tube contacts the riverbed and then sends a sensing signal to the control module for stopping pushing the multi-layer tube and controlling the photographic unit to capture images of the driving member. According to the images and movement of the measurement module, the control module learns the riverbed elevation and sends the riverbed elevation to a remote monitor unit for real-time monitoring of the riverbed elevation.

19 Claims, 5 Drawing Sheets

TELESCOPIC PROBE MONITORING SYSTEM FOR RIVERBED ELEVATION MONITORING AT BRIDGE PIERS

BACKGROUND OF THE INVENTION

1. Fields of the Invention

The present invention relates to a monitoring system for riverbed elevation monitoring at bridge piers, especially to a telescopic probe monitoring system for riverbed elevation monitoring at bridge piers in real time manner.

2. Descriptions of Related Art

In recent years, natural disasters caused by storms and associated floods become more frequent and severe all over the world. When the typhoon or hurricane comes, it causes serious flooding in the rivers and severe scour around the bridge pier leading to the exposure of bridge foundations. As a result, the lateral load acted on the bridge pier is insufficient and the bridge may be tilted or broken. Once the flooding is too violent, the pier may even be washed away, and the bridge collapses and people passing through the bridge may fall into the river. The above situation not only results in traffic interruption, but also great damages to human lives, common property and local construction. Now in order to observe the riverbed scour at bridge piers and make an alarm, a monitoring system is developed. Thus the severe condition of bridge pier scour can be found as early as possible so as to assure the bridge safety and provide a precaution alarm. The traffic safety is ensured and the secondary damage caused by the broken bridge can be avoided. Moreover, the lifetime of the bridge is also extended by strengthening and repair taken in time. Furthermore, by long-term record of monitor data, a complete database of the bridge pier scour is established for bridge pier protection and riverbed restoration in the future.

Among a lot of technologies that monitor the bridge pier scour available in the literatures, the most common methods are as followings:

Ground penetrating radar: is a non-destructive method that uses electromagnetic radiation in the high frequency band of the radio spectrum, and detects the reflected signals from subsurface structures. Thus the elevation changes of the riverbed under the water are obtained. The advantage of this method is that the changes in the riverbed elevation can be recorded continuously yet the shortcoming is that the operation is time-consuming and staffs require professional training.

Numbered bricks: a brick array formed by bricks with fixed size and sequential numbers is mounted under the riverbed at the upstream of bridge piers. When a flood comes, the riverbed elevation change is measured by considering the positions and numbers of the bricks swept away. The disadvantage of the method is that it requires digging in the riverbed for mounting the brick array and each set of array can be used only once. Moreover, only the scour depth is learned while the sediment deposition is unable to detect.

Sliding magnetic collar: a slide bar with a hollow design is disposed on the surface of a bridge pier and a collar sleeve moves along the slide bar. When the flood scours, the collar sleeve moves downward to stop at a specific position corresponding to the change of scour depth. A magnetic sensor disposed in the slide bar moves along with the collar sleeve and sends movement signals to externals by wires. The disadvantage of this method is that it only records the scour depth but the sediment deposition is unable to be detected.

Auto-lens monitoring: a hollow, transparent and waterproof tube is embedded into the riverbed at a bridge pier and fixed at the bridge pier. A photographic equipment for monitoring is disposed on the holder, which is moved vertically on the rail under the control of a stepper motor so as to monitor the sand scour around. When the surface rises due to deposition of sediment or falls due to scouring, a real-time image recognition system is used to detect the sand surface. Thus, the scour change caused by either deposition of sediment or scouring can be detected. The disadvantage of this method is the large power consumption. Moreover, the transmission quality is unstable, easy to be interfered by the motor due to the wireless data transmission. Under harsh environments, the interface between the water and the sand surface may be difficult to judge. Furthermore, the device needs to be embedded into the riverbed.

Multiple-lens monitoring: this method is similar to the above method. However, the auto-moving lens driven by the motor is replaced by a plurality of multiple lenses. Each lens is used to track the scour or deposition positions of the sand surface. This method not only improves the power consumption problem, but also provides better transmission. However, the interface between sand and water is still difficult to be defined under harsh environments. Moreover, this method needs to embed the device into the riverbed.

Gravity-type scour measuring device: the sand surface falls due to scouring and the detector also falls along with the sand surface due to gravity. The elevation decreasing is measured so as to obtain the scour depth. The shortcoming of the method is the embedding of the measuring device and only the scour is detected. When sediments deposit, it is unable to detect.

Transmitter of scour monitoring for soil layer: a plurality of transmitters is embedded in the soil layer. When the sand surface is scoured to a certain degree, the transmitters are moved or disturbed to send signals so as to obtain the scouring of the sand surface. The disadvantage of the method is that this method is only applied to detect scouring of the sand surface. As to the sediment being deposited on the riverbed, it just doesn't work. Moreover, this is a one-shot method. And the transmitters need to be embedded into the riverbed.

Optical sensor: a measuring system that detects by fiber bragg grating. Once optical fiber is attached with medium, the refractive index in the optical fiber changes and wavelength shift occurs. Thus the depth of the medium can be estimated. The disadvantage of the method is that the optical fiber requires contacting the water surface or sand surface. The optical fiber is fragile and is easy to get damaged. Moreover, this method needs to embed the system into the riverbed.

Probe monitoring system: the device is disposed on a bridge pier. A measuring rod is driven to contact the riverbed for measurement of the elevation. A pressure sensor is disposed on the bottom of the measuring rod. When the measuring rod detects the sand surface under the water and contacts the sand surface, the pressure sensor is pressed and the measuring rod stops moving immediately. The scouring depth or deposition height of the sand surface is obtained by calculation of the depth that the measuring rod moved downward. The disadvantage of this method is that the length of the measuring rod should be quite long if the water surface is much higher than the sand surface. Moreover, the device is easy to be destroyed by external objects such as flooding or rocks.

The monitor methods available now all have certain limitations and shortcomings in use. Thus how to monitor the riverbed scouring at bridge piers by a better method for extending the lifetime of the bridge has become an important issue now.

Thus there is a need to find out a new monitoring system for riverbed elevation monitoring at bridge piers that overcomes above shortcomings and monitors the riverbed elevation in a real-time manner.

SUMMARY OF THE INVENTION

Therefore it is a primary object of the present invention to provide a telescopic probe monitoring system for riverbed elevation monitoring at bridge piers, in which a driving member having a plurality of scales and controlled by a control module is used to push a multi-layer tube to extend downward to the riverbed. When the extended multi-layer tube reaches the riverbed, a photographic unit takes pictures of the driving member and processes images. According to the results of image processing, the control module gets the riverbed elevation at the bridge piers and sends data of the riverbed elevation to a remote monitor unit instantly for real-time monitoring of the riverbed elevation.

It is another object of the present invention to provide a telescopic probe monitoring system for riverbed elevation monitoring at bridge piers in which the control module controls a measurement module to move downward and the driving member of the measurement module pushes the multi-layer tube to extend. When the multi-layer tube touches the riverbed, the control module gets the riverbed elevation at the bridge piers by analyzing the movement of the measurement module. And the control module further sends data of the riverbed elevation to the remote monitor unit in a real-time manner for real-time monitoring of the riverbed elevation changes.

It is a further object of the present invention to provide a telescopic probe monitoring system for riverbed elevation monitoring at bridge piers, which is disposed above the riverbed. There is no need to dig in the riverbed for mounting the telescopic probe monitoring system. Thus the set-up of the system is simple and the cost is reduced.

It is a further object of the present invention to provide a telescopic probe monitoring system for riverbed elevation monitoring at bridge piers, which obtains data of the riverbed elevation in real-time manner and sends the data of the riverbed elevation to the remote monitor unit for real-time monitoring and recording the riverbed elevation changes. There is no need to transmit monitoring images. Thus the data amount transmitted is reduced and the bandwidth consumption is reduced effectively.

In order to achieve above objects, a telescopic probe monitoring system for riverbed elevation monitoring at bridge piers of the present invention includes a measurement module and a control module. The measurement module for measuring the riverbed elevation under the water is disposed on the bridge pier. The measurement module consists of a housing, a multi-layer tube, a driving member, a photographic unit, and a sensing unit. The multi-layer tube, the driving member with a plurality of scales for driving the multi-layer tube to extend to riverbed, and the photographic unit for capturing images of the driving member are all mounted in the housing. The sensing unit is arranged at the bottom of the multi-layer tube. When the control module controls the driving member to push the multi-layer tube to extend and the sensing unit on the bottom of the multi-layer tube contacts the riverbed under the water, the sensing unit sends a sensing signal to the control module so as to make the driving member stop pushing the multi-layer tube. Meanwhile, the photographic unit takes pictures of the driving member and produces images. The control module gets the riverbed elevation according to the results of image processing and sends the riverbed elevation to a remote monitor unit for real time monitoring and recording of the riverbed elevation.

Moreover, the control module can also get the distance of the multi-layer tube's extension according to the movement and status of the measurement module. The riverbed elevation is transmitted to the remote monitor unit in a real-time manner for real-time monitoring of the riverbed elevation. The telescopic probe monitoring system for riverbed elevation monitoring is waterproof and is able to be disposed over the riverbed under the water, without being embedded into the riverbed. Thus there is no need to dig out the riverbed for mounting the monitoring system. Therefore, the simple set-up of the monitoring system saves both labor and cost.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

Figure 1:
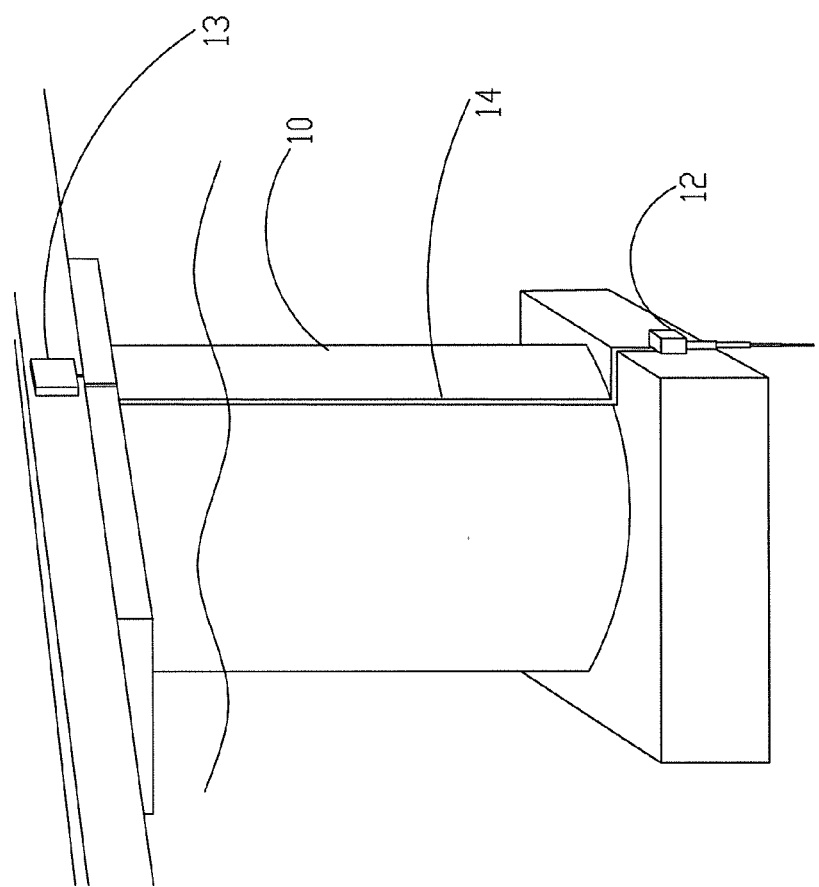
FIG. 1 is a schematic drawing showing an embodiment of the present invention arranged at a bridge pier.
Figure 3:
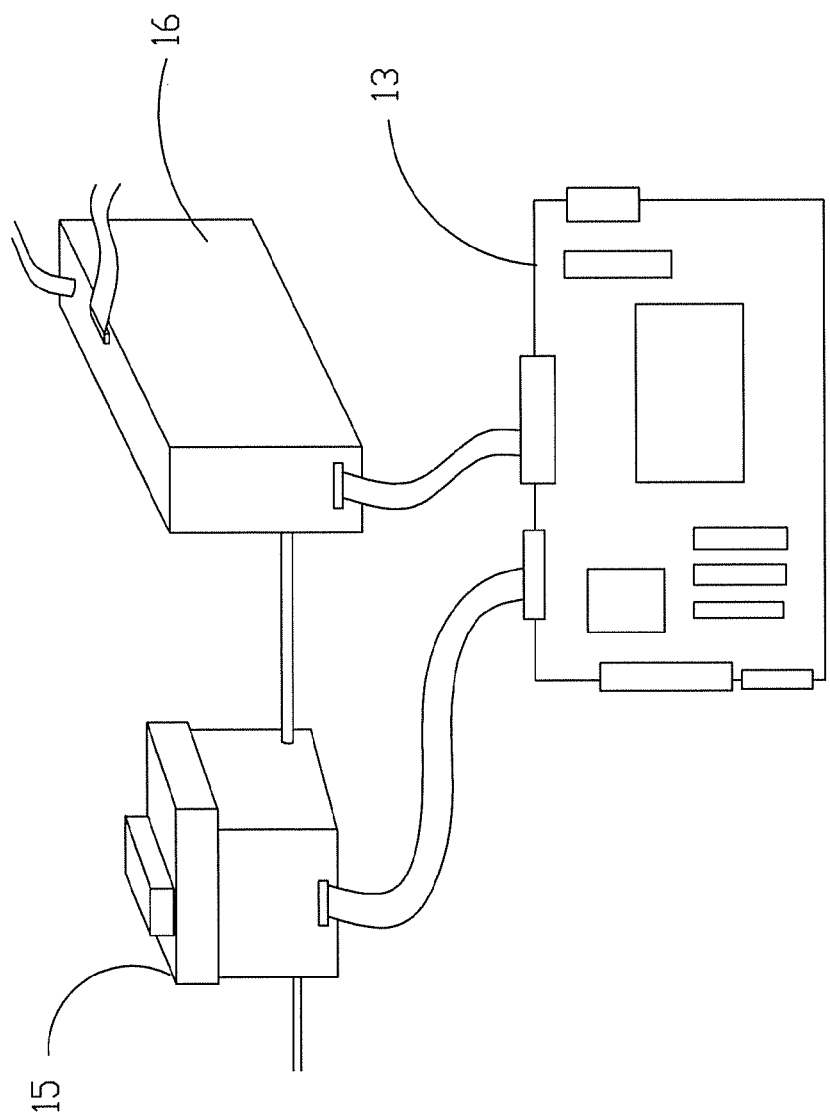
FIG. 3 is an embodiment of a control module according to the present invention.

Referring to FIG. 1, a schematic drawing of an embodiment of a telescopic probe monitoring system for riverbed elevation monitoring at bridge piers is revealed. As shown in the figure, the telescopic probe monitoring system is arranged at a pier 10 and is used for real-time monitoring riverbed elevation changes under the water. The disposition way of the telescopic probe monitoring system over the pier 10 is not limited and the position of the telescopic probe monitoring system can be above or under the water. The telescopic probe monitoring system of the present invention includes a measurement module 12 and a control module 13. The measurement module 12 is to detect the riverbed under the water and send data measured to the control module 13 for calculation and image recognition by a signal transmission line 14. The control module 13 is connected to a power supply unit 15 (as shown in FIG. 3) that provides both the measurement module 12 and the control module 13 power required. The measurement module 12 and the control module 13 are connected with each other by the signal transmission line 14.

The control module 13 is disposed above the water such as upper parts of the pier or bridge deck and is enclosed in a waterproof protective cover for safety purposes. Moreover, the volume of the whole telescopic probe monitoring system submerged in the water is reduced. This helps the management and maintenance of the present system. As to the measurement module 12, it is arranged under the water to be as close to the riverbed as possible so as to detect riverbed level without excessive extension of the multi-layer tube 123 (as shown in FIG. 3). Due to its position under the water, the measurement module 12 is covered by a waterproof and impact-resistant protective housing 121, as shown in FIG. 2.

The housing 121 can be made from steel for water and bump resistance. Moreover, a waterproof membrane is disposed inside the housing 121 for better waterproofing. The telescopic probe monitoring system of the present invention are divided into two parts—the measurement module 12 and the control module 13 so as to have more effective system management and maintenance, reduce influence on the flow field due to smaller volume, and reduce risk of being hit by foreign objects.

Figure 2:
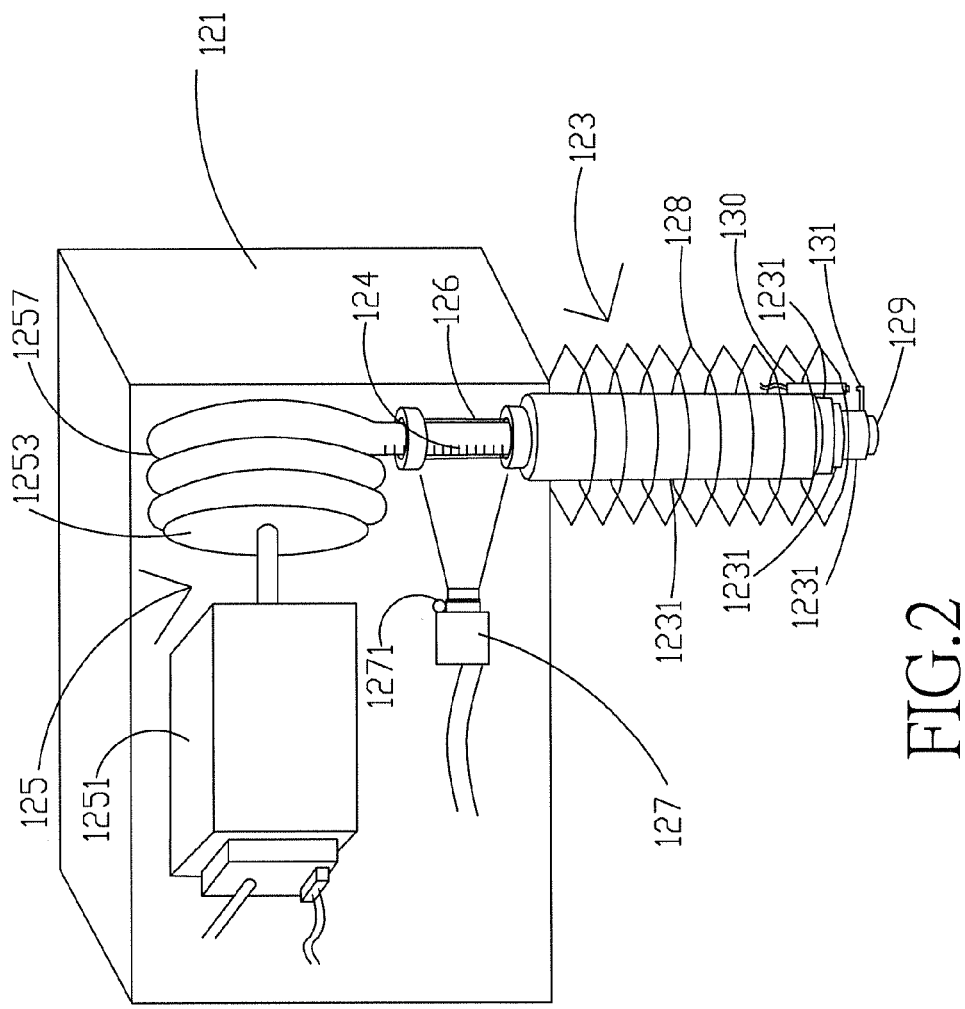
FIG. 2 is a schematic drawing showing an embodiment of a measurement module according to the present invention.

Referring to FIG. 2 and FIG. 3, the schematic drawings showing structure of a measurement module and a control module of the present invention are disclosed. The telescopic probe monitoring system of the present invention includes the measurement module 12 shown in FIG. 2 and the control module 13 shown in FIG. 3. The measurement module 12 for detecting the riverbed under the water is disposed on the pier 10 (shown in FIG. 1) and is composed of the housing 121, a multi-layer tube 123, a driving member 125, a photographic unit 127, and a sensing unit 129. The multi-layer tube 123 is a telescopic tube having multiple layers and is mounted in the housing 121. The driving member 125 is also mounted in the housing 121 and having a driving hose 1257 that pushes the multi-layer tube 123 to extend. Thus the multi-layer tube 123 is extended and touched the riverbed to get the riverbed elevation. The driving hose 1257 is with a plurality of scales 124. The photographic unit 127 set in the housing 121 is used to capture images of the scales 124 on the driving hose 1257 of the driving member 125 and transmit images to the control module 13.

Moreover, the multi-layer tube 123 is equipped with a window 126 so as to allow the photographic unit 127 capturing images of the driving hose 1257. In a preferred embodiment of the photographic unit 127, it is a Charge Coupled Device (CCD) or other photographic apparatus. The sensing unit 129 is disposed on the bottom of the multi-layer tube 123. When the multi-layer tube 123 is driven by the driving member 125 to extend and the sensing unit 129 contacts the riverbed, the sensing unit 129 sends a sensing signal to the control module 13 through transmission lines inside the multi-layer tube 123. Then the control module 13 controls the driving member 125 to stop pushing the multi-layer tube 123. A preferred embodiment of the above sensing unit 129 is a pressure sensor.

Still referring to FIG. 2 and FIG. 3, the control module 13 is for control of the driving member 125 and the photographic unit 127 so as to make the measurement module 12 measure the riverbed elevation. When the control module 13 controls the driving member 125 to push the multi-layer tube 123, the multi-layer tube 123 is extended until the sensing unit 129 on the bottom thereof contacts the riverbed and sends the sensing signal to the control module 13. Then the control module 13 enables the driving member 125 to stop pushing the multi-layer tube 123. And the photographic unit 127 takes pictures of the scale 124 on the driving hose 1257 of the driving member 125 and generates images. The images are analyzed so as to learn data of the scale 124 in the image. Thus the riverbed elevation is obtained. According to the images, the control module 13 obtains the data of the riverbed elevation and further sends the data to a remote monitor unit 55 in FIG. 5. Thus the remote monitor unit 55 performs real-time monitoring and records the riverbed elevation changes.

Before the driving hose 1257 of the driving member 125 starting to push the multi-layer tube 123 and the multi-layer tube 123 is not moved yet, the control module 13 controls the photographic unit 127 to capture images of the scale 124 on the driving hose 1257. An initial image is generated and is transmitted to the control module 13. The control module 13 analyzes the initial image to get a value of the initial scale 124 shot by the photographic unit 127. Then the driving hose 1257 of the driving member 125 pushes the multi-layer tube 123 to extend and contact the riverbed, the control module 13 again makes the photographic unit 127 shoot the scale 124 on the driving hose 1257 and images are produced. Next the control module 13 analyzes the images to get the value of the scale 124 in the images. Compared with the value of the initial scale, the change of riverbed elevation at the moment is obtained.

In the probe monitoring system of the present invention, the control module 13 arranged at the pier 10 is above the water while the measurement module 12 under the water is not required to be mounted into the riverbed. Thus the set-up of the system is easy. Moreover, there is no need to dig in the riverbed so that the structure of the pier 10 will not be damaged.

Furthermore, besides the driving hose 1257, the driving member 125 of the present invention further includes a motor 1251, a rotating disc 1253. The rotating disc 1253 is disposed on a main shaft of the motor so that the driving hose 1257 is wound around the rotating disc 1253. The motor 1251 also drives the rotating disc 1253 to rotate so as to wind and unwind the driving hose 1257. When the driving hose 1257 is wound around the rotating disc 1253, the multi-layer tube 123 is shortened and raised up. On the contrary, the multi-layer tube 123 is pushed by the driving hose 1257 to extend. In a preferred embodiment, the motor 1251 is a stepper motor.

In addition, the multi-layer tube 123 includes a plurality of pipes 1231. The diameter of each pipe 1231 is different. The pipe 1231 with smaller diameter is sleeved in the pipe 1231 with larger diameter and the pipes 1231 are connected. The driving hose 1257 is connected to the pipe 1231 with smallest diameter for pushing the pipe 1231 with smallest diameter and further driving other pipes 1231 to extend. Thus the multi-layer tube 123 is extended to reach the riverbed.

The telescopic probe monitoring system of the present invention further includes a sensing unit 130 and a locating piece 131. The sensing unit 130 is disposed beside the pipe 1231 with largest diameter of the multi-layer tube 123 while the locating piece 131 is arranged at the side of the pipe 1231 with smallest diameter. When the control module 13 controls the motor 1251 to drive the rotating disc 1253 and the rotating disc 1253 rotates to wind the driving hose 1257 therearound, the driving hose 1257 drives the pipe 1231 with smallest diameter moving upward and further the rest pipes 1231 are retracted into the pipe 1231 with the largest diameter. While the locating piece 131 contacting the sensing unit 130, the sensing unit 130 sends a sensing signal to the control module 13. The sensing signal represents that the pipes 1231 of the multi-layer tube 123 have turned back to the original positions. According to the sensing signal received, the control module 13 controls the motor 1251 to stop working so that the multi-layer tube 123 stops moving upward. Moreover, according to the value of the scale obtained previously, the control module 13 gets the distance that the multi-layer tube 123 is extended downward. According to the distance the multi-layer tube 123 extended downward, the control module 13 controls the motor 1251 of the diving unit 125 to drive the multi-layer tube 123 retracting upward the same distance and turning back to the original position. The telescopic probe monitoring system of the present invention further includes a waterproof telescopic protective tube 128 covering outside the multi-layer tube 123 so as to protect the multi-layer tube 123.

The telescopic probe monitoring system of the present invention further includes a power supply unit 15 (as shown in FIG. 3) that provides power to the system components such as the measurement module 12 and the control module 13. In a preferred embodiment of the present invention, the power supply unit 15 can be a utility power, a battery, a hydroelectric power unit or a photovoltaic energy unit. The way of the power supply unit 15 to supply power can be in a continuous manner or in a fixed-interval manner. The fixed-interval time step is set by a circuit that controls the power supply period of the power supply unit 15 to components of the system yet the power supplied to the control module 13 is maintained for continuing operation of the monitoring system. Thus the power is saved efficiently and the power supply period of the power supply unit 15 is increased. If the power supply unit 15 provides power continuously that means the full-time monitoring of the riverbed elevation changes is 24 hours all the time. In that case, the power supply unit 15 can be a utility power, a photovoltaic energy unit or a hydroelectric power unit. Once the utility power failure occurs, the power supply unit 15 is turned to use a battery, a hydroelectric power unit or a photovoltaic energy unit. Moreover, the telescopic probe monitoring system of the present invention further includes at least one lighting unit 1271 (shown in FIG. 2) mounted in the housing 121. The lighting unit 1271 provides the photographic unit 127 sufficient light for capturing images. In a preferred embodiment, the lighting unit 1271 is a light emitting diode (LED) light.

As shown in FIG. 3, a telescopic probe monitoring system of the present invention further includes a driving unit 16 that drives the motor 1251 to move. The driving unit 16 is coupled to the power supply unit 15 for receiving power and sending power to the motor 1251 of the measurement module 12. The driving unit 16 is also coupled to and controlled by the control module 13.

Figure 4:
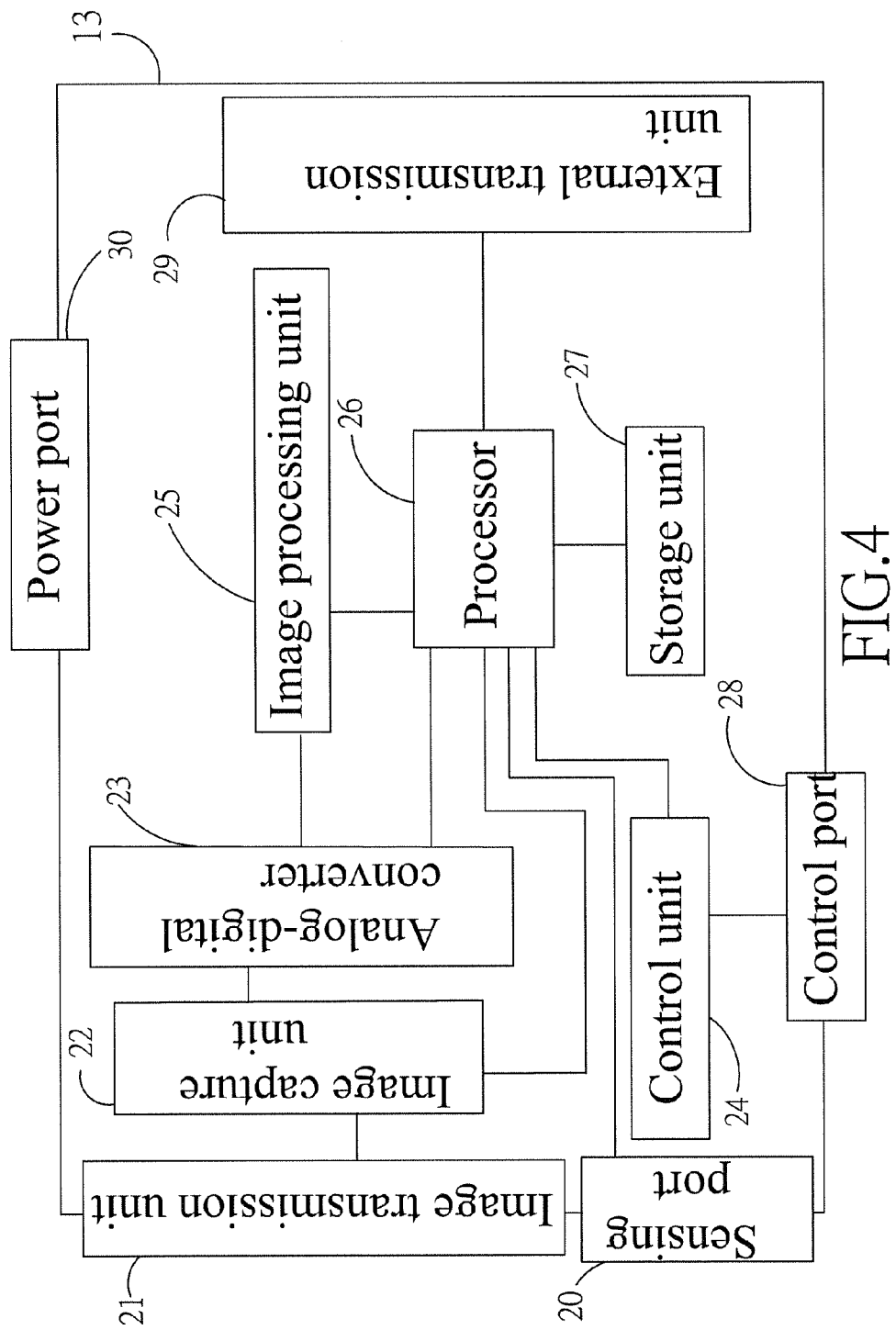
FIG. 4 is a block diagram of a control module of an embodiment according to the present invention.

Referring to FIG. 4, the control module 13 of the present invention is composed of a sensing port 20, an image transmission unit 21, an image capture unit 22, an analog-digital converter 23, a control unit 24, an image processing unit 25, a processor 26, a control port 28, an external transmission unit 29, and a power port 30. The image transmission unit 21 which is an interface for image transmission connected with the photographic unit 127 for receiving images from the photographic unit 127. The image capture unit 22 is coupled to the image transmission unit 21, capturing images from the image transmission unit 21 and sending the captured images to the analog-digital converter 23. The analog-digital converter 23 digitalizes the image to generate a digital image. The digital image generated is sent to the image processing unit 25. The present invention further includes a storage unit 27 that is coupled to the processor 26 and a system software executed by the processor 26 is stored therein.

The image processing unit 25 is coupled to the analog-digital converter 23 and is used for digital image analysis so as to get the number of the scale 124 on the driving hose 1257 in the image. According to the number of the scale 124 got by the image processing unit 25, the processor 26 obtains the riverbed elevation under the water surface. The image analysis in the image processing unit 25 uses techniques available now to get the scale 124 so that the processor 26 learns the riverbed elevation. The external transmission unit 29 is coupled to the processor 26 for receiving and sending the riverbed elevation to the remote monitor unit 55 (shown in FIG. 5). Thus the system operators can learn the riverbed elevation changes in a real-time manner and have long-term records for follow-up in the future.

All the data obtained has been processed completely in the control module 13. The external transmission unit 29 only sends the riverbed elevation data to the remote monitor unit 55 outside, without transmission of images. Thus the transmission requires the minimum bandwidth. Moreover, the riverbed elevation change can be calculated by the control module 13 according to the riverbed elevation obtained now and the riverbed elevation obtained last time and then the riverbed elevation change is sent to the remote monitor unit 55. In a preferred embodiment, the external transmission unit 29 can be a wired transmission unit or a wireless transmission unit.

The processor 26 is coupled to the image capture unit 22 and the analog-digital converter 23 for control of the image capture unit 22 and the analog-digital converter 23. The processor 26 further controls the photographic unit 127 through the image capture unit 22 and the image transmission unit 21. Or the processor 26 is coupled to the photographic unit 127 for control of the photographic unit 127 directly. The storage unit 27 with a system software stored therein is coupled to the processor 26 and the processor 26 executes the system software. The control unit 24 is coupled to the processor 26 for receiving a command from the processor 26 so as to generate a control signal according to the command from the processor 26 and send the control signal to the control port 28 and further to the measurement module 12 (as shown FIG. 2) for driving the driving member 125 to move. In this embodiment, the control port 28 is coupled to the motor 1251 of the driving member 125 by the transmission line. In a preferred embodiment, the control unit 24 is a motor control chip. The sensing port 20 is coupled to the sensing units 129, 130 in FIG. 2 for receiving the sensing signals from the sensing units 129, 130 and sending the sensing signals to the processor 26. After receiving the sensing signals, the processor 26 learns that the multi-layer tube 123 has extended and its bottom has reached the riverbed or the multi-layer tube 123 has already turned back to the original position. Thus the processor 26 drives the control unit 24 to control the driving member 125 and make the driving member 125 stop moving the multi-layer tube 123 upward or downward.

Furthermore, the control module 13 can get the distance the multi-layer tube 123 extended by analyzing the movement of the measurement module 12 and further obtain the riverbed elevation under the water surface. The control signal generated by the control unit 24 is for control of extension or retraction of the multi-layer tube 123 so that the control signal indicates the status of the multi-layer tube 123. For example, the control unit 24 either controls the motor 1251 in FIG. 2 to rotate several turns or a certain number of steps. Thus the processor 26 of the control module 13 gets the status of the measurement module 12 through the control unit 24 such as the number of turns the motor 1251 rotates or the rotating disc 1253 rotates. By analyzing the movement of the measurement module 12, the processor 26 further calculates and obtains the distance the multi-layer tube 123 extended. According to the extended distance of the multi-layer tube 123, the riverbed elevation is got. Therefore, the control module 13 of the present invention gets the riverbed elevation by analyzing the images from the photographic unit 127 or by analyzing the status of the multi-layer tube 123 so as to get the riverbed elevation and achieve real-time monitoring.

In addition, the power port 30 is coupled to the power supply unit 15 (as shown in FIG. 3) for receiving power from the power supply unit 15. The control module 13 further sends power to the motor 1251 of the driving member 125 for providing power the motor 1251 needs.

Figure 5:
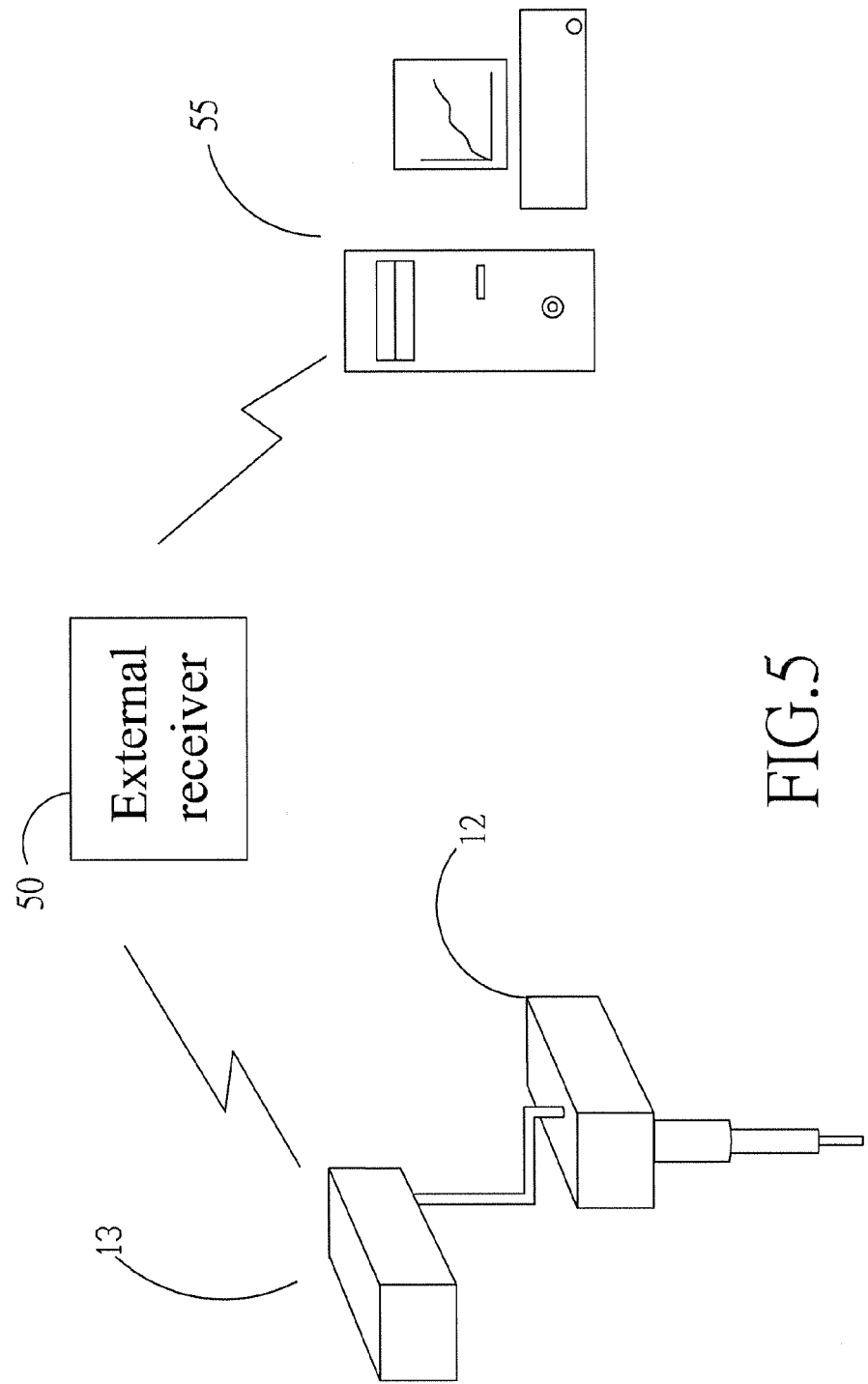
FIG. 5 is a schematic drawing showing a remote transmission in a monitoring system of the present invention.

Referring to FIG. 5, the riverbed elevation obtained is transmitted to the remote monitor unit 55. The control module 13 sends the elevation data to an outer receiver 50 in a wired way or a wireless way. Then the outer receiver 50 further transmits the elevation data to the remote monitor unit 55 for people monitoring the riverbed to learn the riverbed elevation under the water surface and record the related data in the remote monitor unit 55. A database is built up for reference purposes in the future, and a curve showing elevation variations can be displayed on the remote monitor unit 55 as shown in FIG. 5. Moreover, the remote monitor unit 55 can calculate the riverbed elevation change according to the received riverbed elevation. The remote monitor unit 55 of the present invention can be a computer or other electronic devices such as a personal digital assistant (PDA).

In summary, a telescopic probe monitoring system for riverbed elevation monitoring at bridge piers of the present invention includes a measurement module and a control module, separated from each other. The measurement module is disposed on the bridge pier and is for measuring the riverbed elevation under the water. The measurement module is composed of a housing, a multi-layer tube, a driving member, a photographic unit, and a sensing unit. The multi-layer tube is mounted in the housing and the driving member with a plurality of scales is also arranged in the housing. The driving member pushes the multi-layer tube to extend and contact the riverbed. The photographic unit is set in the housing and is for shooting the scales of the driving member and having images. The sensing unit is disposed on the bottom of the multi-layer tube. When the control module controls the driving member to move the multi-layer tube, the multi-layer tube is extended and the sensing unit contacts the riverbed under the water. Then, a sensing unit from the sensing signal is sent to the control module so as to make the driving member stop pushing the multi-layer tube and make the photographic unit take pictures of the driving member for generating images. According to analysis of the images or the status of the measurement module, the control module learns the riverbed elevation at the bridge piers and sends the riverbed elevation to the remote monitor unit instantly. Therefore, the riverbed elevation is monitored in a real-time manner.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A telescopic probe monitoring system for riverbed elevation monitoring at bridge piers comprising:
   a measurement module arranged at a bridge pier under the water for measuring elevation of a riverbed under water; the measurement module having a housing, a multi-layer tube mounted in the housing, a driving member that is attached with a plurality of scales, mounted in the housing and used for pushing the multi-layer tube to extend and contact the riverbed; a photographic unit mounted in the housing for taking pictures of the driving member and producing images; and a sensing unit disposed on bottom of the multi-layer tube;
   a control module coupled to the driving member and the photographic unit; the measurement module and the control module separated with each other;
   wherein the control module controls the driving member to push the multi-layer tube for extension of the multi-layer tube; while the sensing unit on bottom of the multi-layer tube contacts the riverbed under the water, the sensing unit sends a sensing signal to the control module for control of the driving member to stop pushing the multi-layer tube; the photographic unit shoots the driving member to generate the image; the control module gets the elevation of the riverbed according to the image and sends the elevation to a remote monitor unit.

2. The system as claimed in claim 1, wherein the driving member further includes:
   a motor;
   a rotating disc disposed on the motor; and
   a driving hose wound around the rotating disc; the motor drives the rotating disc to rotate for further driving the driving hose to push the multi-layer tube to extend.

3. The system as claimed in claim 2, wherein the telescopic probe monitoring system for riverbed elevation monitoring at bridge piers further includes:
   a driving unit under control of the control module and used to drive the motor.

4. The system as claimed in claim 1, wherein the multi-layer tube further includes:
   a plurality of pipes with different diameters; the pipe with smaller diameter is sleeved in the pipe with larger diameter and the pipes are connected; the driving hose pushes the pipe with smallest diameter and further drives the rest pipes to extend so that the multi-layer tube is extended to reach the riverbed.

5. The system as claimed in claim 1, wherein the telescopic probe monitoring system for riverbed elevation monitoring at bridge piers further includes:
   a waterproof telescopic protective tube disposed outside the multi-layer tube.

6. The system as claimed in claim 1, wherein the telescopic probe monitoring system for riverbed elevation monitoring at bridge piers further includes:
   a power supply unit coupled to the measurement module and the control module for providing the measurement module and the control module power required; the power supply unit is a utility power, a battery, a hydroelectric power unit or a photovoltaic energy unit.

7. The system as claimed in claim 1, wherein the control module includes:
   an image transmission unit that is coupled with the photographic unit and is used to receive images from the photographic unit,
   an image capture unit coupled to the image transmission unit and used for capturing images from the image transmission unit;
   an analog-digital converter that is coupled to the image capture unit and is used for converting the image captured by the image capture unit to generate a digital image;
   an image processing unit coupled to the analog-digital converter and used for analyzing the digital image so as to get the elevation of the riverbed;
   a processor coupled to the image processing unit and used for receiving the elevation of the riverbed;
   an external transmission unit coupled to the processor and used for transmitting the elevation of the riverbed to the remote monitor unit;
   a control unit coupled to the processor and receiving a command from the processor to generate a control signal according to the command; and
   a control port coupled to the control unit, receiving the control signal, and sending the control signal to the driving member for control of the driving member.

8. The system as claimed in claim 7, wherein the telescopic probe monitoring system for riverbed elevation monitoring at bridge piers further includes:
   a storage unit that is coupled to the processor and is stored with a system software executed by the processor.

9. The system as claimed in claim 7, wherein the external transmission unit is a wired transmission unit or a wireless transmission unit.

10. The system as claimed in claim 1, wherein the photographic unit is disposed with a lighting unit.

11. A telescopic probe monitoring system for riverbed elevation monitoring at bridge piers comprising:
- a measurement module arranged at a bridge pier under the water for measuring elevation of a riverbed under water; the measurement module having a housing, a multi-layer tube mounted in the housing, a driving member that is attached with a plurality of scales, mounted in the housing and used for pushing the multi-layer tube to extend and contact the riverbed; and a sensing unit disposed on bottom of the multi-layer tube;
- a control module coupled to the driving member; the measurement module and the control module separated with each other;
- wherein the control module controls the driving member to push the multi-layer tube for extension of the multi-layer tube; while the sensing unit on bottom of the multi-layer tube contacts the riverbed under the water, the sensing unit sends a sensing signal to the control module for control of the driving member to stop pushing the multi-layer tube; the control module analyzes a movement of the measurement module to get the elevation of the riverbed and sends the elevation to a remote monitor unit.

12. The system as claimed in claim 11, wherein the driving member further includes:
- a motor;
- a rotating disc coupled to the motor; and
- a driving hose wound around the rotating disc; the motor drives the rotating disc to rotate for further driving the driving hose to push the multi-layer tube to extend;
- the control module gets the elevation of the riverbed by analyzing the number of turns the motor or the rotating disc rotates.

13. The system as claimed in claim 12, wherein the telescopic probe monitoring system for riverbed elevation monitoring at bridge piers further includes:
- a driving unit under control of the control module and used to drive the motor.

14. The system as claimed in claim 11, wherein the multi-layer tube further includes:
- a plurality of pipes with different diameters; the pipe with smaller diameter is sleeved in the pipe with larger diameter and the pipes are connected; the driving hose pushes the pipe with smallest diameter and further drives the rest pipes to extend so that the multi-layer tube is extended to reach the riverbed.

15. The system as claimed in claim 11, wherein the telescopic probe monitoring system for riverbed elevation monitoring at bridge piers further includes:
- a waterproof telescopic protective tube disposed outside the multi-layer tube.

16. The system as claimed in claim 11, wherein the telescopic probe monitoring system for riverbed elevation monitoring at bridge piers further includes:
- a power supply unit coupled to the measurement module and the control module for providing the measurement module and the control module power required; the power supply unit is a utility power, a battery, a hydroelectric power unit or a photovoltaic energy unit.

17. The system as claimed in claim 11, wherein the control module includes:
- a processor for analyzing the movement of the measurement module to get the elevation of the riverbed;
- an external transmission unit coupled to the processor and transmitting the elevation of the riverbed to the remote monitor unit;
- a control unit coupled to the processor and receiving a command from the processor to generate a control signal according to the command; and
- a control port coupled to the control unit, receiving the control signal, and sending the control signal to the driving member for control of the driving member.

18. The system as claimed in claim 17, wherein the telescopic probe monitoring system for riverbed elevation monitoring at bridge piers further includes:
- a storage unit that is coupled to the processor and is stored with a system software executed by the processor.

19. The system as claimed in claim 17, wherein the external transmission unit is a wireless transmission unit or a wired transmission unit.

* * * * *